RASTER CORRECTION CIRCUIT ARRANGEMENT

Filed Dec. 23, 1964 2 Sheets-Sheet 1

INVENTORS
C. BAILEY NEAL &
LAWRENCE R. POEL
BY
ATTORNEY

RASTER CORRECTION CIRCUIT ARRANGEMENT
Filed Dec. 23, 1964 2 Sheets-Sheet 2
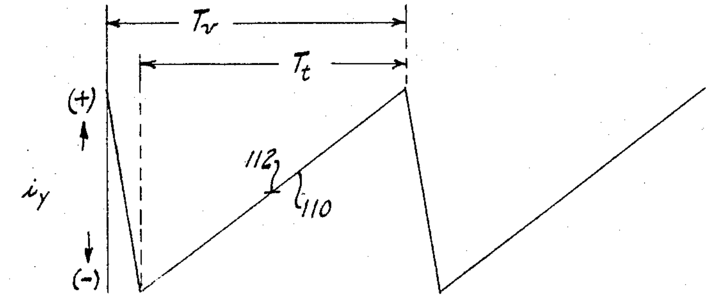
FIG. 4
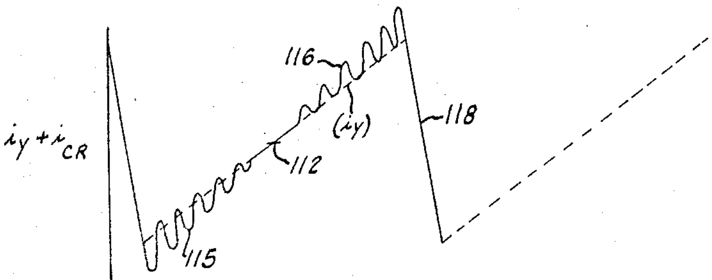
FIG. 5
FIG. 6
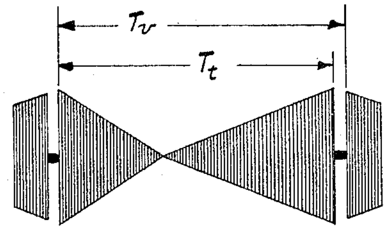
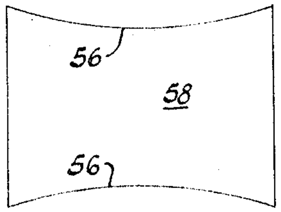
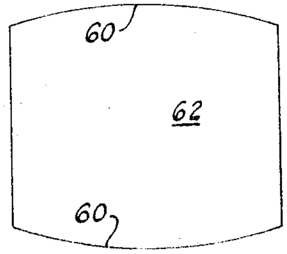
FIG. 2
FIG. 3
INVENTORS
C. BAILEY NEAL &
LAWRENCE R. POEL
BY
ATTORNEY United States Patent Office 3,463,961
Patented Aug. 26, 1969

3,463,961

RASTER CORRECTION CIRCUIT ARRANGEMENT

Charles Bailey Neal and Lawrence R. Poel, Batavia, N.Y., assignors to Sylvania Electric Products Inc., a corporation of Delaware Filed Dec. 23, 1964, Ser. No. 420,535
Int. Cl. H01j 29/70
U.S. Cl. 315—24 6 Claims

ABSTRACT OF THE DISCLOSURE

A circuit for effecting pincushion and barrel distortion correction occurring in the direction of vertical scan in a television receiver, which utilizes two amplifying devices having their outputs connected to opposite ends of a center tapped primary winding of a transformer. A periodically recurring signal at the horizontal deflection frequency is applied in parallel to the control electrode of the two amplifying devices and opposite phases of a periodically recurring ramp signal are also applied to the respective control electrodes. The oppositely phased ramp signals cause the amplifying devices to be alternately conducting. The push-pull output arrangement causes phase reversal of the modulated horizontal signal component which is coupled to the secondary winding of the transformer connected in series with the vertical deflection cells thereby effecting the desired raster correction in the direction of vertical scan.

This invention relates to circuit arrangements for correcting raster distortion in television apparatus. The invention relates more particularly to circuit arrangements for effecting pincushion and barrel distortion occurring in the direction of vertical scan.

Various factors contribute to the creation of the well-known pincushion and barrel distortions in a television apparatus. These factors include the electrical characteristics of a deflection yoke utilized in the apparatus as well as a deviation between the centers of deflection of the scanning electron beam and curvature of the viewing screen. Although the effects of pincushion and barrel are more discernible near the perimeter of the raster, as characterized by a bowing-in or bowing-out of the edges, this form of distortion generally extends over the entire raster areas and increases in severity in approximately parabolic fashion as the distance of electron beam deflection from the center of the raster becomes greater.

Pincushion and barreling are objectionable and various arrangements are known for reducing the distortion. Adequate correction has been provided in the direction of horizontal scan by generating a horizontal deflection current having an envelope of parabolic waveform. However, similar envelope shaping of vertical deflection current cannot be employed to correct distortions occurring in the direction of vertical scan.

In correcting vertical scanning distortion, a ramp segment of the vertical deflection sawtooth waveform is generally modified in amplitude during the trace interval. In a known circuit arrangement for effecting this correction, a vertical output stage employing a pair of power amplifying devices is arranged in a push-pull amplifier arrangement. Oppositely phased ramp segments of a signal of sawtooth waveform and field scanning frequency are applied to electrodes of the device for causing a deflection current to flow in vertical deflection windings. A signal of line scanning rate is derived from a horizontal deflection section of the receiver, integrated to form a parabolic waveform, and coupled to the electrodes for modulating the deflection current amplitude. The amplitude of a ramp segment of deflection current thereby increases in accordance with the displacement of the electron beam from the center of the raster. In addition to the two output devices and the integrating circuit, this arrangement utilizes a sawtooth waveform generator and a phase inverter. Such an arrangement is relatively costly and the correction circuit is incompatible for use with the more economical present-day vertical deflection stages which simply require an output device and discharge tube for generating the sawtooth deflection current.

Accordingly, it is an object of this invention to provide a television apparatus having an improved circuit arrangement for effecting pincushion and barrel raster correction in the direction of vertical scanning.

Another object of the invention is to provide television apparatus having a push-pull amplifier circuit arrangement which is adapted for use with relatively economical present-day vertical deflection circuit arrangements.

Another object of this invention is to provide in a television apparatus, having a vertical deflection raster circuit, an improved means for deriving a modulating signal of line scanning frequency and parabolic waveform for use with the correction circuit.

In another known circuit arrangement for correcting this raster distortion, means are provided for generating a correction current $i_{cr}$ having a characteristic "bow-tie" modulation envelope and for combining this current with the ramp segment of the vertical deflection current. The correction current $i_{cr}$ has a frequency $f_h$ which is substantially greater than the field rate $f_v$ while its modulation envelope recurs periodically at the field rate $f_v$.

In a particular arrangement for generating the "bow-tie" modulation envelope, signals $e_{c1}$ and $e_{c2}$ of line scanning frequency $f_h$, but of opposite phase, are combined to form a resultant signal $e_{cr}$ which is coupled to the vertical deflection coils of the yoke. The signal $e_{c1}$ is of substantially constant amplitude whereas the envelope of the signal $e_{c2}$ is of sawtooth configuration having a maximum amplitude which is substantially twice the amplitude of $e_{c1}$. During one portion of the trace interval the signal $e_{c2}$ operates to diminish the amplitude of the resulting signal $e_{cr}$ until at a midpoint in the trace interval the signals $e_{c1}$ and $e_{c2}$ are mutually canceled and the resultant $e_{cr}$ attains zero amplitude. During another portion of the trace interval, the amplitude of the signal $e_{c2}$ dominates and the resultant $e_{cr}$, which is now of opposite phase, increases in amplitude.

In prior arrangements of this type, cancellation of the signal $e_{c1}$ by $e_{c2}$ to provide the resultant $e_{cr}$ is accomplished only after laborious adjustment of multiple interdependent adjustable circuit elements. Consequently, unless a high degree of care is exercised in effecting the circuit adjustments, crossover in the envelope waveform at the midpoint in the trace interval is often distorted or displaced in time and satisfactory raster correction is therefore not provided. In addition, the plurality of adjustable circuit elements increases the cost of the apparatus. In television receiving apparatus, where economy of fabrication is of primary importance, the cost of multiple adjustable elements is disadvantageous.

Another object of this invention is to provide an improved circuit arrangement of a type adapted for generating a correction signal having a "bow-tie" envelope.

A further object of the invention is to provide a correction circuit arrangement having improved correction signal cancellation characteristics.

Still another object of the invention is to provide a correction circuit arrangement requiring fewer circuit adjustments than prior arrangements.

In accordance with the present invention, a circuit arrangement for generating a current of "bow-tie" waveform and for combining it with a vertical deflection current includes first and second amplifying devices arranged in a push-pull amplifier configuration. Means apply a signal of field scanning frequency $f_v$ and of sawtooth waveform to the first device and a similar signal of opposite phase to the second device. A signal of substantially greater frequency $f_h$ is coupled to each of the amplifying devices and the output current from the amplifier is coupled in series with a vertical deflection coil. A current $i_c$ of frequency $f_h$ and of decreasing amplitude is thereby generated during a first portion of the trace interval while a current $i_{c2}$ of frequency $f_h$ of opposite phase and of increasing amplitude is provided during another part of the trace interval. The resultant current $i_{cr}$ is of the desired "bow-tie" waveform. Circuit means coupled to the vertical deflection coil cause a current of sawtooth waveform to flow in the winding while the correction current $i_{cr}$ varies the amplitude of a ramp segment of this current in accordance with displacement of the beam from the center of the raster. By this arrangement, signal cancellation is avoided and improved correction is effectetd.

These and other objects and attending advantages of the invention will become apparent with reference to the following specification and drawings in which:

FIGURE 2 is a diagram of a raster configuration illustrating pincushion distortion occurring in the direction of vertical scanning;

FIGURE 3 is a diagram of a raster configuration illustrating barrel distortion occurring in the direction of vertical scanning;

FIGURE 4 is a diagram of the sawtooth waveform of uncorrected vertical deflection current;

FIGURE 5 is another diagram of the sawtooth waveform of vertical deflection current and illustrating its modification for correcting pincushion distortion; and FIGURE 6 is a diagram of correction current illustrating an unsymmetrical "bow-tie" waveform.

Figure 1:
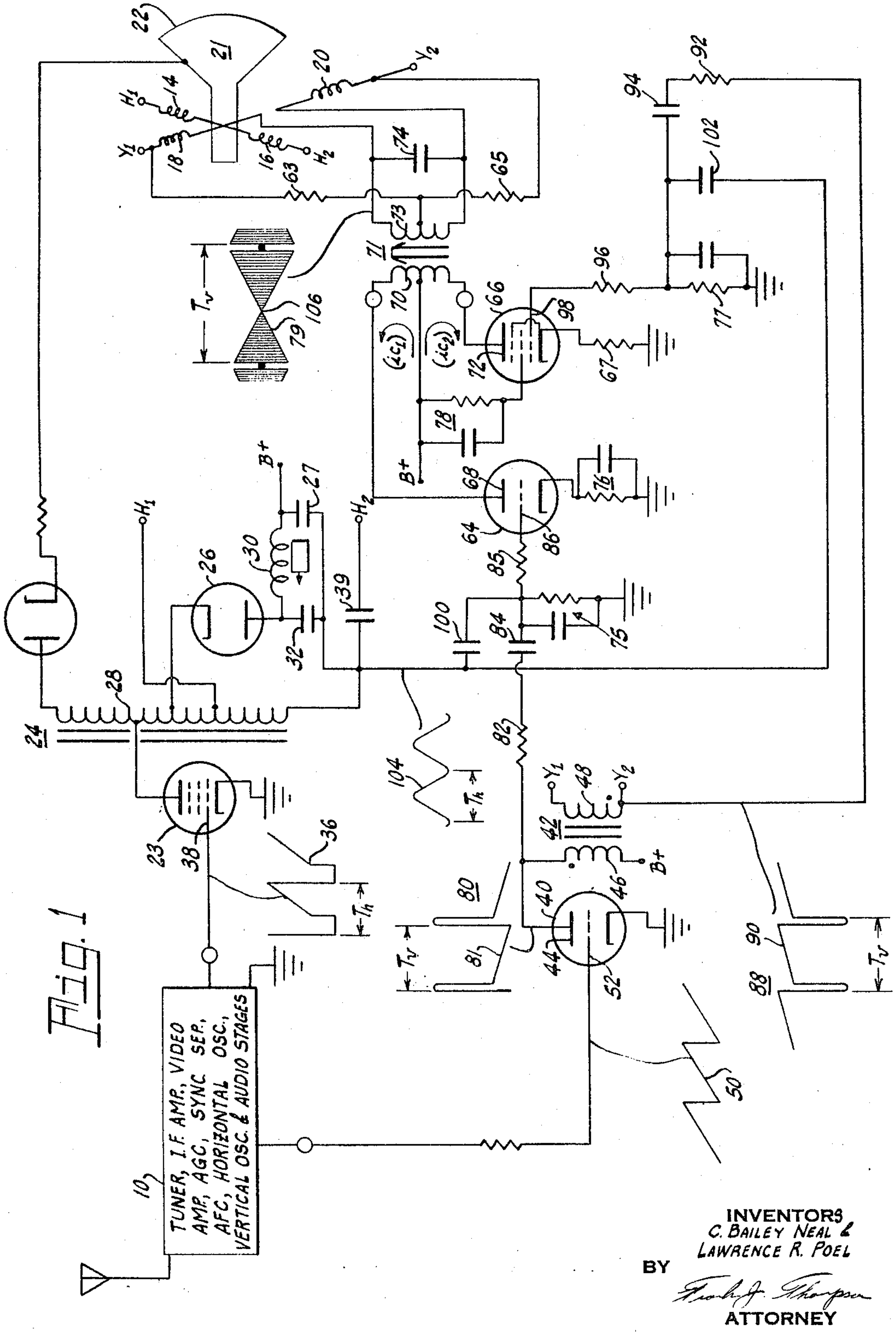
FIGURE 1 is a diagram of a television receiving apparatus, partly in block and partly in schematic form, illustrating an embodiment of the invention.

Referring now to FIGURE 1, the television receiving apparatus shown includes a tuner, an intermediate frequency amplifier stage, a video detector and amplifier stage, an automatic gain control stage, a synchronizing signal separator stage, an automatic frequency control stage, a horizontal oscillator stage, a vertical oscillator discharge tube stage, and audio stages. The arrangement and operation of these stages, which are represented generally by the block 10, are well known in the art. A yoke comprising horizontal deflection coils 14 and 16 and vertical deflection coils 18 and 20 is provided for deflecting an electron beam of a cathode ray device 21 in a scanning raster on a viewing screen 22 thereof. Means for causing a deflection current of sawtooth waveform and line scanning frequency $f_h$ to flow in the coils 14 and 16 includes a horizontal output stage having an output amplifying device 23 and an output transformer indicated generally as 24. Power recovery circuit means, including a damper diode 26 and a $B^+$ boost capacitor 27 are coupled to a winding 28 of the transformer and are adapted for operating in accordance with well-known reaction scanning principles. A network comprising the $B^+$ boost capacitor 27, an adjustable inductor 30, and a filter capacitor 32 is arranged for adjusting the linearity of deflection of the scanning electron beam in the direction of horizontal scanning. The horizontal oscillator stage generates a deflection waveform 36 which is applied to a control electrode 38 of the device 23. This deflection signal causes current to flow in the transformer winding 28 and in the horizontal deflection windings 14 and 16 via the terminals $H_1$ and $H_2$ and a capacitor 39. The capacitor functions to block D.C. and to provide raster stretching near the center of scan.

Means for establishing a sawtooth deflection current in the vertical deflection windings 18 and 20 include a vertical output stage having an output amplifying device 40 and an output transformer indicated generally as 42. Direct current operating potential is applied to an anode 44 of the device 40 via a primary winding 46 of the transformer 42. The vertical deflection coils 18 and 20, which are coupled in series by a resonant circuit which is described more fully hereinafter, are coupled to a secondary winding 48 of the transformer 42 at the terminals $Y_1$ and $Y_2$. The device 40 may comprise the output stage of a conventional vertical deflection output tube and discharge tube arrangement. A deflection signal of generally sawtooth waveform 50, which is derived at the plate circuit of the discharge tube, not shown, is applied to a control electrode 52 of the amplifying device 40 and causes a periodically recurring current to sawtooth waveform and field deflection frequency $f_v$ to flow in the coils 18 and 20.

As indicated hereinbefore, various factors operate to introduce distortions of the pincushion and barrel type into a raster being formed on the viewing screen 22 of the cathode ray tube 21 by the scanning electron beam. In FIGURE 2, the characteristic pincushion bowing-in of the edges 56 of a raster 58 with respect to a center of the raster is shown while FIGURE 3 illustrates the characteristic barrel bowing-out of edges 60 with respect to a center of the raster 62. The distortions illustrated in FIGURES 2 and 3 occur in the direction of the vertical scanning.

A circuit arrangement for correcting these distortions is illustrated in FIGURE 1. A first amplifying device 64 and a second amplifying device 66 are arranged in a push-pull amplifying configuration. An anode electrode 68 of the device 64 is coupled to one terminal of a center tapped primary winding 70 of an adjustable transformer 71 while the anode electrode 72 of the device 66 is coupled to an opposite terminal on the winding 70. A secondary winding 73 is coupled in series with the vertical deflection coils 18 and 20 and forms a part of a resonant circuit which is tuned to the line scanning frequency $f_h$ by a capacitor 74. The resistors 63 and 65, which are coupled to a center tap of the secondary winding 73, shunt the vertical deflection coils 18 and 20, respectively, and damp oscillations which occur. Operating bias is provided for the triode device 64 by the RC network 76. Operating bias is provided for the pentode device 66 by cathode resistor 67 while screen voltage is established by the network 78.

Signals of a frequency $f_v$ and of a greater frequency $f_h$, as for example the line scanning frequency, are coupled to the devices 64 and 66 for generating in the secondary winding 73 a correction current $i_{cr}$ having an envelope of "bow-tie" waveform 79. A signal voltage $e_{c1}$ appearing at the anode electrode 44 of the vertical output device 40 has a waveform indicated generally as 80. This waveform includes a negative going ramp segment 81. A voltage attenuating resistor 82, a D.C. blocking capacitor 84, and a parasitic suppression resistor 85 couple the signal $e_{c1}$ to a control electrode 86 of the device 64. A signal $e_{c2}$, having a saw-tooth waveform, indicated generally as 88, occurs across the secondary winding 48 of the vertical output transformer. This waveform includes a positive going ramp segment 90 which differs in phase by 180° with respect to the ramp segment 81 of the waveform at the anode of the output device 40. The signal $e_{c2}$ is coupled from the terminal $Y_2$ via a resistor 92, a capacitor 94, and a parasitic suppression resistor 96 to a control electrode 98 of the amplifying device 66. In addition, a periodically recurring signal having a frequency greater than the frequency $f_v$ is coupled to the control electrodes of the devices 64 and 66. In FIGURE 1, the signal is shown to be derived from the horizontal deflection circuit and coupled to the control electrodes by capacitors 100 and 102. This signal is shown to have a parabolic waveform 104 and is extracted from the linearity correction network. The signal may also be derived from the terminal $H_2$.

The manner in which the correction current $i_{cp}$ of desired "bow-tie" waveform is generated may be explained with reference to FIGURES 1, 4, and 5. Ramp segments 81 and 90 of the waveforms 80 and 88 cause the amplifying devices 64 and 66, respectively, to alternately conduct during portions of the trace interval $T_t$ of the vertical deflection period $T_v$. These ramp signals are modulated at the line deflection rate by the signal 104. Thus, during the first half of the trace interval the more positive portion of the ramp segment 81 occurs and causes the device 64 to become conductive and a current $i_{c1}$ to flow in a circuit formed by a source of D.C. operating potential, a portion of the primary winding 70 of the transformer 71, and the device 64. Since the ramp segment 81 has a negative slope, the amplitude of the current $i_{c1}$ continuously decreases from initiation of the trace interval. The various circuit components establish operating voltages, and the amplitude of the signal $e_{c1}$ is adapted for providing cutoff of the current $i_{c1}$ at a crossover point 106 during the trace interval (FIGURE 4). Simultaneously at the crossover point, the ramp segment 90 of the waveform 88 causes the device 66 to become conductive and to cause a current $i_{c2}$ to flow from a source of D.C. operating potential, through another segment of the primary winding 70 of the transformer 71, and through amplifying device 66. Since the ramp segment 90 has a positive going slope, the current $i_{c2}$ will increase continuously during the second half of the trace interval of the vertical deflection cycle. The resultant current $i_{cr}$ which flows in the resonant secondary circuit and the deflection coils 18 and 20 during the trace interval $T_t$ has a "bow-tie" waveform 79 (FIGURE 1). The current $i_{c1}$ and $i_{c2}$ flow in opposite directions in the primary winding 70, and consequently the phase of the current $i_{cr}$ reverses at the crossover point 106.

In FIGURE 4, the vertical deflection current $i_y$ having an uncorrected trace segment 110 is shown. In order to reduce typical pincushion distortion, the amplitude of this trace segment should increase in amplitude in a negative direction with respect to the center of the interval 112 during the first portion of the trace interval and should increase in amplitude in a positive direction with respect to the center of the interval 112 during a later portion of the trace interval.

In FIGURE 5, the composite vertical deflection current having a corrected trace segment is illustrated. The frequency of the correction current $i_{cr}$ is reduced in the figure in order to more clearly illustrate the resulting waveform. The resultant deflection current $i_y+i_{cr}$ is illustrated by the solid line curve 115 and the uncorrected current by the dashed curve 116. It is shown in FIGURE 5 that the current $i_{cr}$ differs in phase by 180° on opposite sides of the crossover point, which in FIGURE 5 is shown to coincide until the midpoint 112 of the trace interval. Thus at the beginning of the trace, the amplitude of deflection current is increased where pincushion is more severe and the correction decreases continuously to midpoint of the trace interval where minimum correction is required. During a latter portion of the trace interval, the deflection current increases continuously until initiation of a retrace segment 118. By this circuit arrangement, the requirement for signal cancellation of prior correction circuits of the general type referred to is avoided and crossover is more accurately achieved with attending reduction in raster distortion. Further, only the transformer 71 need be adjusted for resonating the tuned secondary circuit at a frequency $f_h$. The requirement for multiple interdependent adjustment of prior arrangements is also advantageously avoided.

The "bow-tie" waveform 79 of FIGURE 1 is shown to be symmetrical about the crossover point 106 and in FIGURE 5 to have a crossover point which coincides in time with the midpoint 112 of the trace interval $T_t$. When the raster distortion is not symmetrical about the midpoint of beam deflection, an unsymmetrical form of "bow-tie" correction waveform may be desirous. Such a waveform is illustrated in FIGURE 6. The crossover point may be changed by adapting the ramp segments 81 and 90 of the waveforms 80 and 88, respectively, and the D.C. operating voltages of the amplifying devices 64 and 66 to cause the devices 64 and 66 to cut off and conduct current respectively at an earlier or later time during the deflection interval.

The correction circuit arrangement of FIGURE 1 was described for providing pincushion distortion, and the deflection circuit waveform of FIGURE 5 illustrates a deflection current particularly adapted for correcting pincushion. In order to effect barrel correction, the phase of the current $i_{cr}$ during the first and second portion of the trace interval will be reversed with respect to the current $i_{cr}$ shown in FIGURE 5. Such a reversal may be accomplished by suitably polarizing the windings 70 and 75 of the transformer 71 or by inverting the signal 104.

In FIGURE 1, the amplifying device 66 is represented as a pentode. Such a device is employed in the application shown therein to provide increased gain since the peak-to-peak amplitude of the ramp segment 90 derived from the secondary winding 48 is generally less than the peak-to-peak amplitude of the ramp segment 81 derived from the anode electrode 44 of the device 40. However, various other amplifying devices may be utilized in practicing the present invention.

While there has been shown and described what is at present considered the preferred embodiment of the invention, it will be obvious to those skilled in the art that various changes and modifications may be made therein without departing from the invention as defined by the appended claims.

What is claimed is:

1. A circuit arrangement for reducing raster distortion in a television apparatus comprising:

a cathode ray tube;

a deflection yoke including horizontal and vertical deflection coils positioned with relation to said cathode ray tube for deflecting an electron beam thereof in a scanning raster;

a horizontal deflection circuit coupled to said horizontal deflection coils for periodically energizing said horizontal deflection coils;

said horizontal deflection circuit including means for providing a signal which recurs periodically at the horizontal deflection frequency ($f_h$);

a transformer including a primary winding having a center tap and a secondary winding;

a resonant circuit, including said secondary winding, coupled in series with said vertical deflection coils and tuned to the horizontal deflection frequency ($f_h$);

a vertical deflection circuit coupled to said vertical deflection winding for periodically energizing the vertical winding at a frequency ($f_v$);

said vertical deflection circuit including means for providing a first signal of frequency ($f_v$) and having a waveform including a ramp segment of a first phase and a second signal of frequency ($f_v$) having a waveform including a ramp segment of opposite phase;

first and second amplifying devices each having a control electrode;

means coupling the output electrodes of said amplifying devices and said primary winding in a push-pull amplifier configuration;

means coupling said first and second signals from said vertical deflection circuit to the control electrode of said first and second amplifying devices respectively; and means for coupling said signal from said horizontal deflection circuit to the control electrodes of said first and second amplifying devices.

2. The circuit arrangement of claim 1 wherein said means in said horizontal deflection circuit for providing a periodically recurring signal of frequency ($f_h$) comprises means for providing a signal of generally parabolic waveform.

3. The circuit arrangement of claim 2 wherein said means for providing said signal comprises a linearity correction network.

4. In a television apparatus having a cathode ray tube, a raster correction circuit arrangement comprising:

means for deflecting an electron beam of the tube in a scanning raster, said means including a vertical deflection coil and circuit means for causing a deflection current of sawtooth waveform and frequency $(f_v)$ to flow in said coil;

circuit means for providing a first and a second periodically recurring signal of frequency $(f_v)$, said first signal having a waveform including a ramp segment of first phase, said second signal having a waveform including a ramp segment of opposite phase;

circuit means for providing a third periodically recurring signal having a frequency $(f_h)$ which is greater than the frequency $(f_v)$;

first and second amplifying devices each having a control electrode;

means for applying said first and second periodically recurring signals of frequency $(f_v)$ to the control electrodes of said first and second amplifying devices, respectively;

means for applying said third periodically recurring signal to the control electrodes of said first and second amplifying devices;

a transformer having a center-tap primary winding and a secondary winding;

means connecting opposite ends of the primary winding of said transformer to the output electrodes of said first and second amplifying devices, respectively; and means including the secondary winding of said transformer providing a circuit resonant at the horizontal deflection frequency $(f_h)$ coupled in series with said deflection coil.

5. A circuit arrangement for reducing raster distortion in a television apparatus comprising:

a cathode ray tube;

a deflection yoke including horizontal and vertical deflection coils positioned with relation to said cathode ray tube for deflecting an electron beam thereof in a scanning raster;

a horizontal deflection circuit coupled to said horizontal deflection coils for periodically energizing said horizontal deflection coils;

said horizontal deflection circuit including a linearity correction network having a $B^+$ boost capacitor for providing a signal of generally parabolic waveform which recurs periodically at the horizontal deflection frequency $(f_h)$, said signal of generally parabolic waveform being derived from a terminal of said $B^+$ boost capacitor;

a transformer including a primary winding having a center tap and a secondary winding;

a resonant circuit, including said secondary winding, coupled in series with said vertical deflection coils and tuned to the horizontal deflection frequency $(f_h)$;

a vertical deflection circuit coupled to said vertical deflection winding for periodically energizing the vertical winding at a frequency $(f_v)$;

said vertical deflection circuit including means for providing a first signal of frequency $(f_v)$ and having a waveform including a ramp segment of a first phase and a second signal of frequency $(f_v)$ having a waveform including a ramp segment of opposite phase;

first and second amplifying devices each having a control electrode;

means coupling the output electrodes of said amplifying devices and said primary winding in a push-pull amplifier configuration;

means coupling said first and second signals from said vertical deflection circuit to the control electrode of said first and second amplifying devices respectively; and means for coupling said signal from said horizontal deflection circuit to the control electrodes of said first and second amplifying devices.

6. A circuit arrangement for reducing raster distortion in a television apparatus comprising:

a cathode ray tube;

a deflection yoke including horizontal and vertical deflection coils positioned with relation to said cathode ray tube for deflecting an electron beam thereof in a scanning raster;

a horizontal deflection circuit coupled to said horizontal deflection coils for periodically energizing said horizontal deflection coils;

said horizontal deflection circuit including a capacitor having a terminal thereof connected to said deflection coil for providing a signal of generally parabolic waveform which recurs periodically at the horizontal deflection frequency $(f_h)$;

a transformer including a primary winding having a center tap and a secondary winding;

a resonant circuit, including said secondary winding, coupled in series with said vertical deflection coils and tuned to the horizontal deflection frequency $(f_h)$;

a vertical deflection circuit coupled to said vertical deflection winding for periodically energizing the vertical winding at a frequency $(f_v)$;

said vertical deflection circuit including means for providing a first signal of frequency $(f_v)$ and having a waveform including a ramp segment of a first phase and a second signal of frequency $(f_v)$ having a waveform including a ramp segment of opposite phase;

first and second amplifying devices each having a control electrode;

means coupling the output electrodes of said amplifying devices and said primary winding in a push-pull amplifier configuration;

means coupling said first and second signals from said vertical deflection circuit to the control electrode of said first and second amplifying devices respectively; and means for coupling said signal from said horizontal deflection circuit to the control electrodes of said first and second amplifying devices.

References Cited

UNITED STATES PATENTS

| | | |
|---|---|---|
| 2,649,555 | 8/1953 | Lockhart. |
| 3,320,469 | 5/1967 | Slavik. |
| 2,869,026 | 1/1959 | Sanford. |

RODNEY D. BENNETT, Jr., Primary Examiner

JOSEPH G. BAXTER, Assistant Examiner

U.S. Cl. X.R.

315—27